United States Patent [19]
Fujita et al.

[11] Patent Number: 6,119,144
[45] Date of Patent: Sep. 12, 2000

[54] APPARATUS AND METHOD FOR INFORMATION TRANSFER BETWEEN A VIDEO SERVER AND A GENERAL PURPOSE COMPUTER OR THE LIKE

[75] Inventors: Hiroyuki Fujita; Masaki Hirose, both of Kanagawa, Japan

[73] Assignee: Sony Corporation, Tokyo, Japan

[21] Appl. No.: 08/838,315

[22] Filed: Apr. 8, 1997

[30] Foreign Application Priority Data

Apr. 12, 1996 [JP] Japan ..................... 8-091602

[51] Int. Cl.⁷ ..................... G06F 15/16
[52] U.S. Cl. ............ 709/203; 709/200; 709/219; 709/232
[58] Field of Search ............ 395/200.33, 200.3, 395/200.49, 200.62; 709/200, 203, 219, 232

[56] References Cited

U.S. PATENT DOCUMENTS

| | | | |
|---|---|---|---|
| 5,572,645 | 11/1996 | Dan et al. ................. | 395/501 |
| 5,630,059 | 5/1997 | Brady et al. ................ | 709/200 |
| 5,724,514 | 3/1998 | Arias . | |
| 5,727,159 | 3/1998 | Kikinis . | |
| 5,732,219 | 3/1998 | Blumer et al. . | |
| 5,751,716 | 5/1998 | Tzannes et al. ............. | 370/468 |
| 5,764,972 | 6/1998 | Crouse et al. . | |
| 5,768,528 | 6/1998 | Stumm . | |
| 5,784,555 | 7/1998 | Stone . | |
| 5,790,790 | 8/1998 | Smith et al. . | |
| 5,794,230 | 8/1998 | Horadan et al. ............ | 707/2 |
| 5,802,301 | 9/1998 | Dan et al. ................. | 709/223 |
| 5,809,298 | 9/1998 | Nakada ................... | 707/104 |
| 5,864,682 | 1/1999 | Porter et al. .............. | 709/247 |
| 5,933,603 | 8/1999 | Vahalia et al. ............ | 709/225 |

OTHER PUBLICATIONS

Ramakrishna, S; Rao, B.M. "LAN file server performance: a processor sharing model"; Proceedings of IEEE Singapore International Conference on Jul. 3–7, 1995; ISBN: 0–7803–2579–6.

Chen et al. Downloading and Stream Conversion; Supporting Interactive Playout of Videos in a Client Station 1995 IEEE pp. 73–80.

*Primary Examiner*—Krisna Lim
*Attorney, Agent, or Firm*—Frommer Lawrence & Haug, LLP.; William S. Frommer; Dexter T. Chang

[57] ABSTRACT

An apparatus and method for transferring information by a local area network (LAN) between a video server having information stored therein and a general purpose computer. Part of the information may be transmitted on a file basis from the video server to the general purpose computer in accordance with a command of the general purpose computer and a file may be formed therefrom in a file system of the general purpose computer.

16 Claims, 6 Drawing Sheets

APPARATUS AND METHOD FOR INFORMATION TRANSFER BETWEEN A VIDEO SERVER AND A GENERAL PURPOSE COMPUTER OR THE LIKE

BACKGROUND OF THE INVENTION

This invention relates to an information transfer method and apparatus which can be applied for transferring video/audio data between a video server at, for example, a broadcasting station and a general-purpose computer.

Currently, a File Transfer Protocol (FTP) is employed as a technique for data transfer between computers. In this technique, file transfer is carried out between two computers in the following manner. That is, file transfer is requested using a command, such as, "put" or "get", between an FTP server actuated on a remote computer and an FTP client actuated on a local computer, so that actual file transfer is carried out.

On the other hand, a technique for managing video/audio information on the file basis which is stored on a video server constituted by the remote computer, by using a general-purpose computer as the local computer, has been introduced at broadcasting stations, museums and the like equipped with a local area network (LAN).

Meanwhile, when specified files of video information among a number of files of video information stored on the video server are to be transferred, it is conceivable to select necessary video files by index retrieval using character data. In this case, quick retrieval of the necessary video files or quick retrieval by plural users is difficult.

Thus, it is considered to manage video files on the video server using a predetermined image for each video file.

However, since the FTP only allows data transfer on the file basis, transferring a whole video file is the only method for managing video files on the video server by the general-purpose computer by directly applying the FTP technique. This method is time-consuming. In addition, since the storage device like a hard disk drive (HDD) of the general-purpose computer is much smaller in capacity than the storage device of the video server, transfer of a whole file from the server may be impossible.

SUMMARY OF THE INVENTION

Thus, it is an object of the present invention to provide an information transfer method and apparatus which enables transfer of only a necessary part of data in transferring data from the video server.

In order to achieve the above-described object, in an information transfer method according to the present invention for transferring information between a video server storing information therein on the file basis and a general-purpose computer, only data of a part of the information on the file basis is transferred, thus forming a file made of the data of the part on a file system of the general-purpose computer.

Specifically, a time code is used to specify and notify the position and length of desired data of a video file in the video server. Similarly, a desired video/audio channel is notified.

Thus, since only data of the desired length and desired channel at the desired position of the target file can be transferred, the data transfer time can be limited to the minimum level.

DETAILED DESCRIPTION OF THE PREFERRED EMBODIMENT

A preferred embodiment of the information transfer method according to the present invention will now be described. In this embodiment, an information transfer system transfers video/audio data by applying the information transfer method between a video server which is capable of recording and reproducing video/audio data and a personal computer.

The structure of this information transfer system is explained with reference to FIG. 1.

Figure 1:
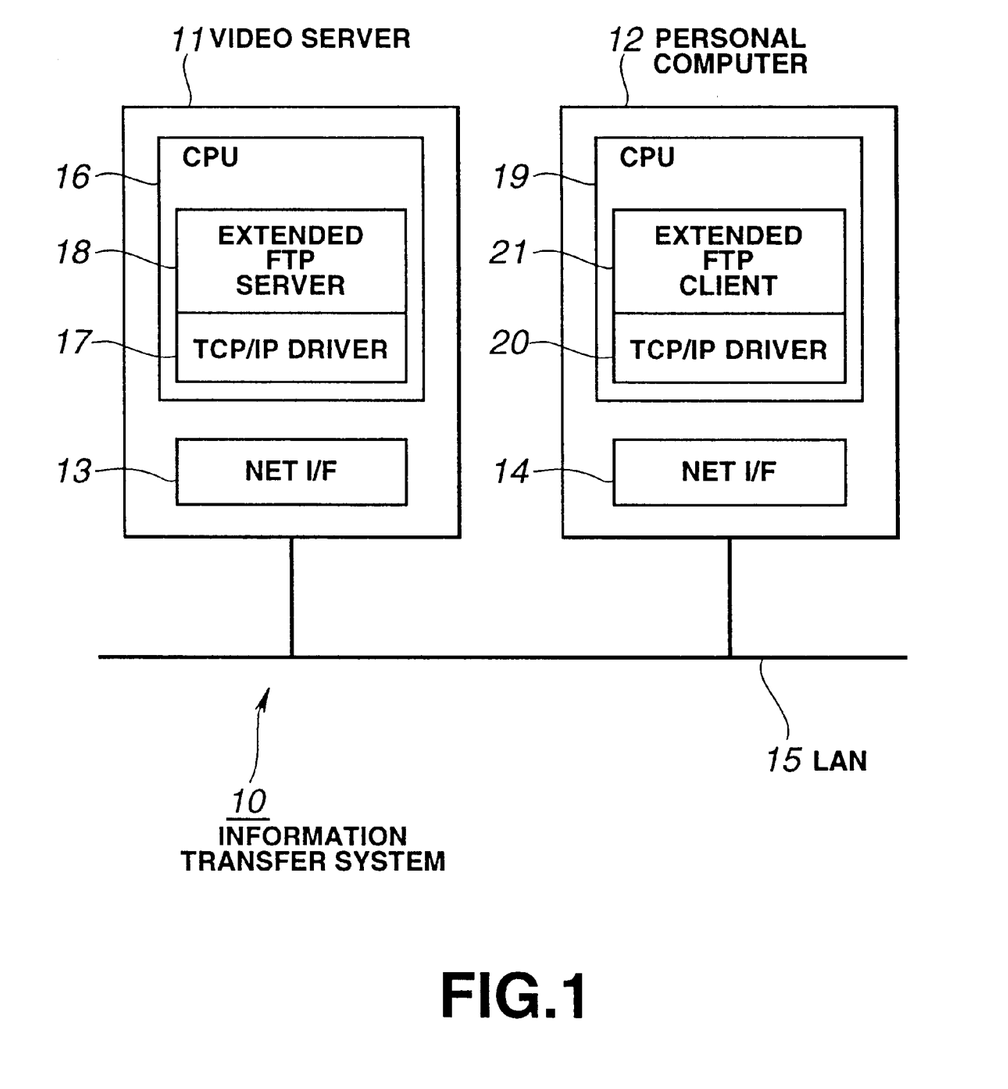
FIG. 1 is a block diagram showing the structure of an information transfer system as an embodiment of the information transfer method according to the present invention.

In FIG. 1, this information transfer system 10 has a video server 11 for recording/reproducing video/audio data, a personal computer 12, and a local area network (LAN) 15 arranged with, for example, Ethernet (which is a communication system jointly developed and produced by Xerox, DEC, and Intel of the United States) for connecting the video server 11 and the personal computer 12.

The video server 11 has a net interface (I/F) 13 for having connection to the LAN 15, and a central processing unit (CPU) 16. On the CPU 16, a Transmission Control Protocol/Internet Protocol (TCP/IP) driver 17 and an extended FTP server 18 are operating.

The TCP/IP driver 17 is a protocol for the Internet, which is a globally diffused computer network.

Unlike the original FTP server, the extended FTP server 18 is a software program for receiving a time code supplied from the personal computer 12 to specify data of a part of information on the file basis, and thus specifying the position and length of the data.

The personal computer 12 has a net I/F 14 for having connection to the LAN 15, and a CPU 19. On the CPU 19, a TCP/IP driver 20 and an extended FTP client 21 are operating.

Unlike the original FTP client, the extended FTP client 21 is a software program for designating a time code for specifying the position and length of data of a part of information on the file basis.

Thus, in the information transfer system 10, the extended FTP server 18 and the extended FTP client 21 are connected through the TCP/IP driver 17, the net I/F 13, the LAN 15, the net I/F 14 and the TCP/IP driver 20, so that transmission/reception of commands and data transfer can be carried out.

Figure 2:
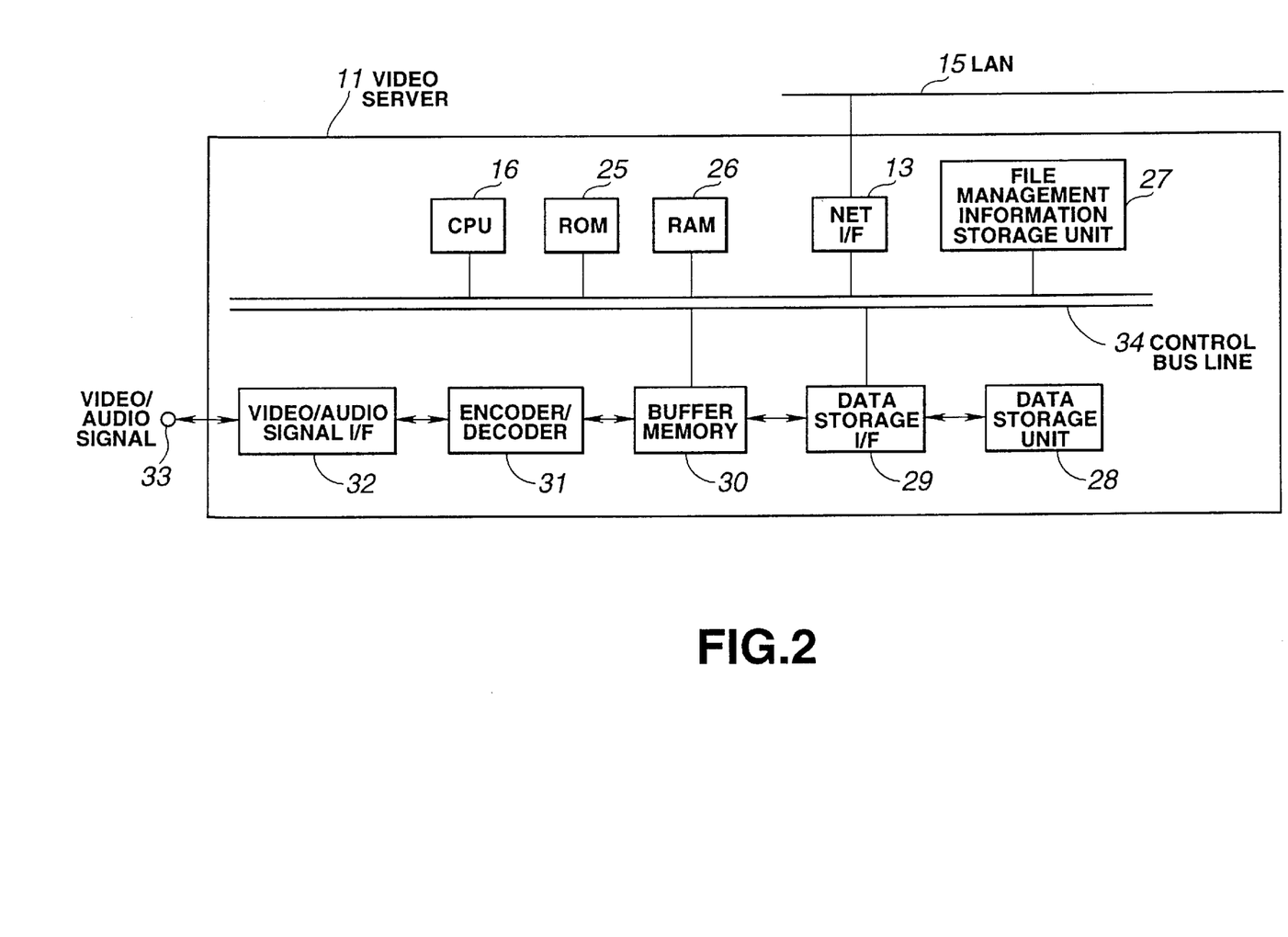
FIG. 2 is a block diagram showing the specific structure of a video server which constitutes the information transfer system.

FIG. 2 shows the specific structure of the video server 11.

The video server 11 records/reproduces plural audio and video data or any one of these data (audio/video data) in response to a request from the personal computer 12.

In the internal structure of the video server 11, the CPU 16, a read only memory (ROM) 25, a random access memory (RAM) 26, the net I/F 13 and a file management information storage unit 27 are connected to a control bus line 34. The ROM 25 has programs of the CPU and software programs like the TCP/IP driver 17 and the extended FTP server 18 stored therein. The RAM 26 is a work area for executing the programs. The net I/F 13 takes input/output signals via the LAN 15 from the personal computer 12 and transmits the signals to the CPU. The file management information storage unit 27 is, for example, a hard disk for storing file management information, as will be described later.

The video server 11 with these components constitutes a computer, and operates in accordance with commands entered from the personal computer 12. The CPU 16 is constituted by, for example, a general-purpose micro-processor or a Reduced Instruction Set Computer (RISC) micro-processor and peripheral circuits thereof. The CPU 16 executes the software programs like the TCP/IP driver 17 and the extended FTP server 18 stored in the ROM 25 using the RAM 26, and thus carries out transmission/reception of commands and data transfer to/from the personal computer 12 via the LAN 15.

A data storage unit 28 is data recording/reproducing means which has a large capacity and is randomly accessible, such as, a hard disk array device. The data storage unit 28 carries out data input/output with an interface circuit (i.e., data storage I/F circuit) 29, such as, a so-called Small Computer Systems Interface (SCSI) connected to the bus line 34. The data storage I/F circuit 29 carries out data input/output with a buffer memory 30 connected to the bus line 34. The buffer memory 30 carries out data input/output with an encoder/decoder 31, and conducts buffering between video/audio signals as constant-speed continuous data and high-speed intermittent data of the data storage unit 28. The encoder/decoder 31 compresses/expands data when necessary, and carries out input/output of audio/video signals with an external terminal 33 via an interface circuit (i.e., audio/video signal I/F circuit) 32 for audio/video signals.

Figure 3:
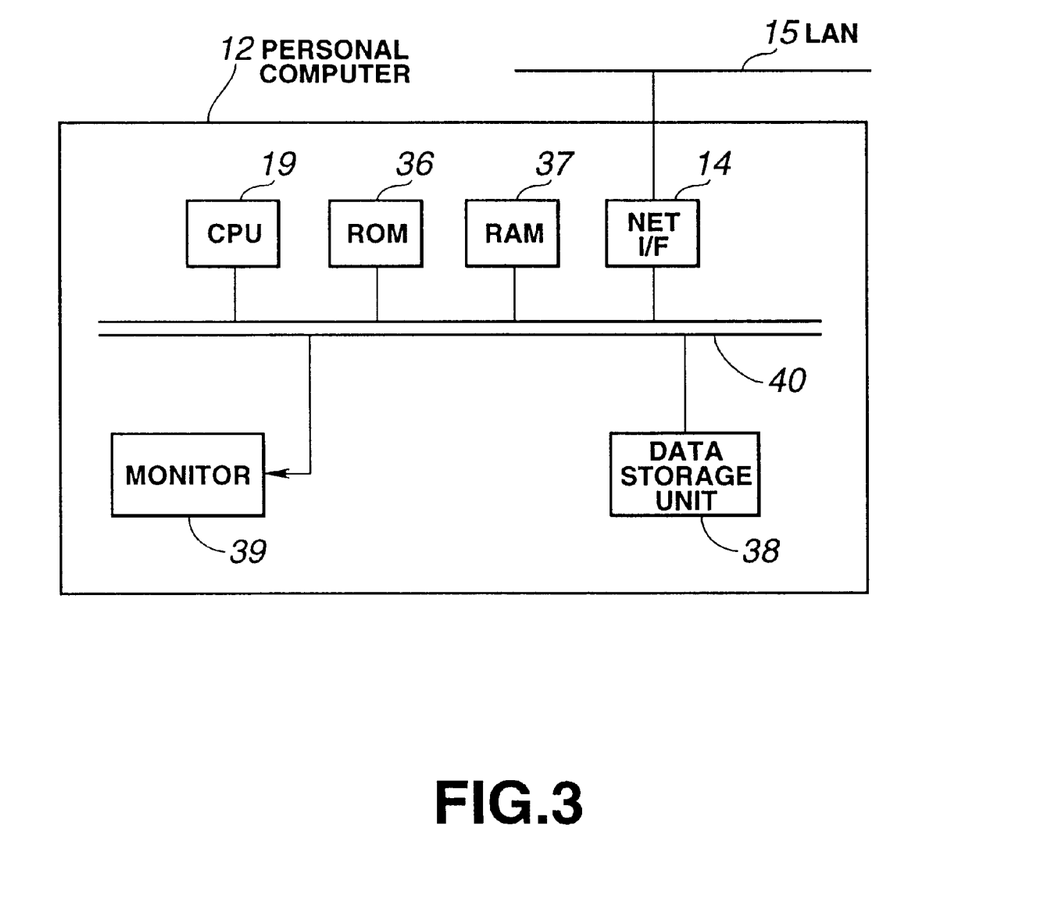
FIG. 3 is a block diagram showing the specific structure of a personal computer which constitutes the information transfer system.

FIG. 3 shows the specific structure of the personal computer 12.

In the internal structure of the personal computer 12, the CPU 19, a ROM 36, a RAM 37, the net I/F 14, a data storage unit 38 and a monitor 39 are connected to a control bus line 40. The ROM 36 has programs of the CPU and software programs like the TCP/IP driver 20 and the extended FTP client 21 stored therein. The RAM 37 is a work area for executing the programs. The net I/F 14 carries out transmission/reception of commands and data transfer to the video server 11 via the LAN 15 from the CPU 19. The data storage unit 38 stores video index data transferred from the video server 11, as will be later described. The monitor 39 displays the video index data and commands.

Figure 4:
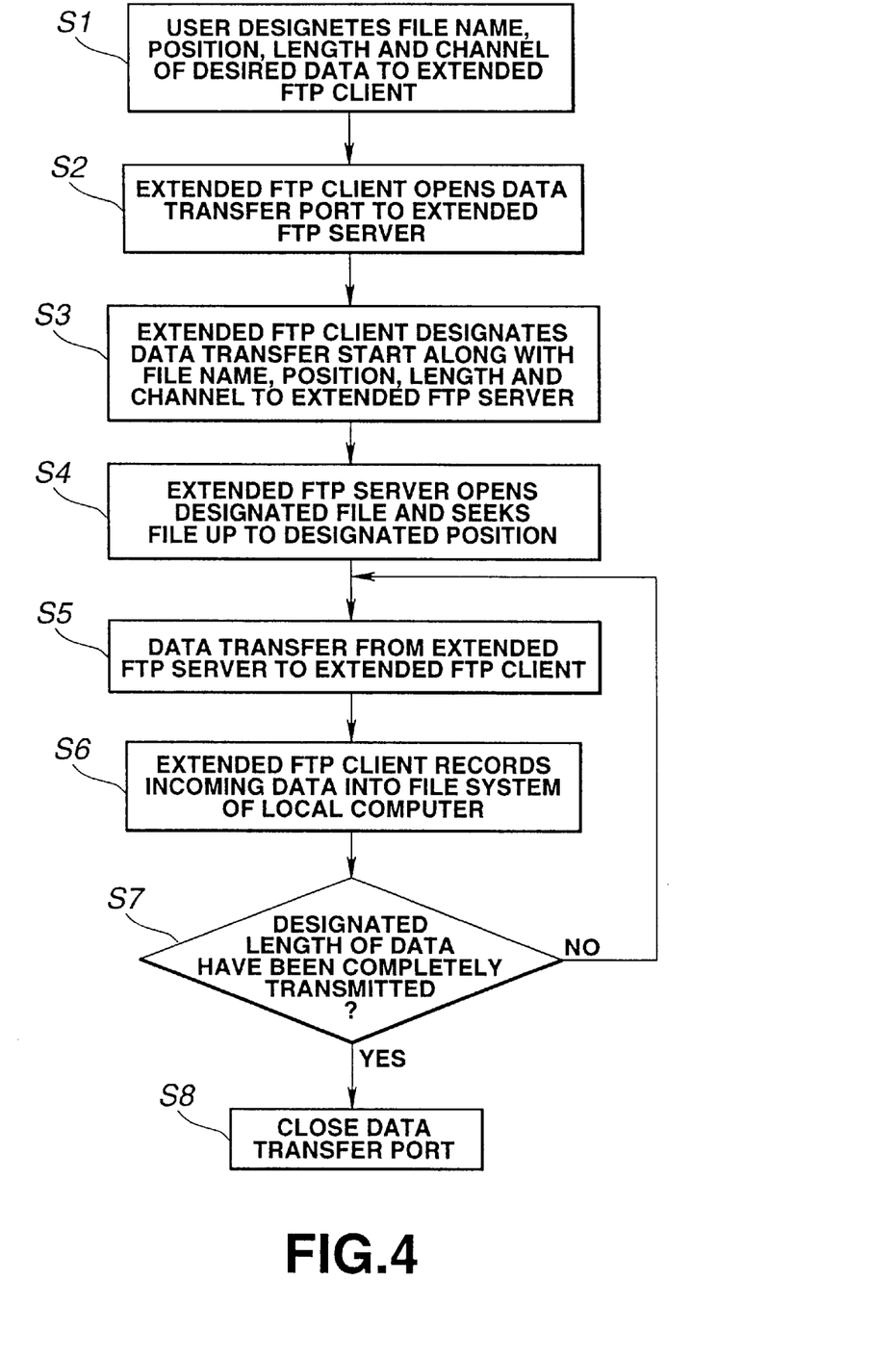
FIG. 4 is a flowchart illustrating data transfer from the video server to the personal computer in the information transfer system.

A specific example of actual data transfer operation in the information transfer system 10 is now explained. FIG. 4 is a flowchart illustrating the procedure of data transfer from the video server 11 to the personal computer 12.

At step S1, a user first instructs the extended FTP client 21 of the personal computer 12 to transfer desired data recorded on the video server 11 and to record the desired data into a file system of the data storage unit 38 on the personal computer 12. In this operation, the user designates a file name including the desired data, a time code indicating a start point of the desired data, a time code indicating the length of the data, and a desired channel (i.e., whether only a video channel or only an audio channel CH1).

In response to this instruction, at step S2, the extended FTP client 21 opens a data transfer port and transmits the open port number together with the IP address to the extended FTP server 18. The extended FTP client 21 thus notifies that this port is to be used for the subsequent data transfer.

Then, at step S3, the extended FTP client 21 sends out a command indicating start of actual data transfer to the extended FTP server 18. In this operation, the extended FTP client 21 also sends the file name, the time code for the start point, the time code indicating the length, and the channel for transfer which are designated by the user, along with the command to start transfer.

In response to this instruction, at step S4, the extended FTP server 18 opens the corresponding file in the video server 11 and seeks the file on the basis of the designated time code. The extended FTP server 18 then shifts a file pointer to the requested transfer start position.

Then, at step S5, the extended FTP server 18 reads data of the requested channel from the open file and transfers the data to the extended FTP client 21. In this operation, data transfer is carried out with the port designated at step S2.

On receiving the data, at step S6, the extended FTP client 21 records the incoming data into the file system within the data storage unit 38 of the personal computer 12.

During this operation, the extended FTP server sequentially checks whether the data of the length designated by the time code have been completely transmitted or not, at step S7. If the data have not been completely transmitted, the operation returns to step S5 to continue data transfer.

On completion of data transfer, at step S8, the extended FTP server 18 closes the file and also closes the port used for data transfer. When the port is closed, the extended FTP client 21 interprets the closure as completion of data transfer and closes the file in which the incoming data are recorded.

Figure 5:
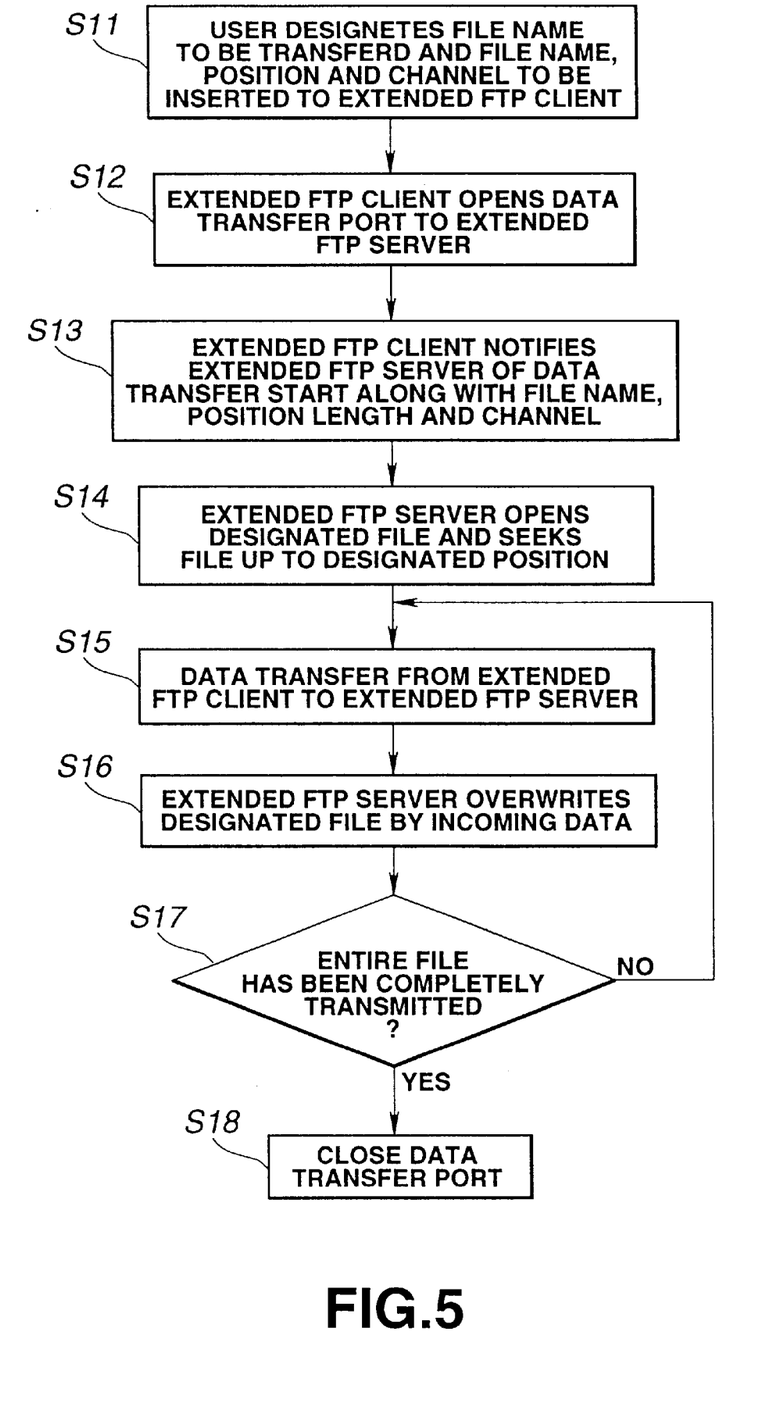
FIG. 5 is a flowchart illustrating data transfer from the personal computer to the video server in the information transfer system.

FIG. 5 shows a specific example of procedure for changing a part of an existing file by data transfer from the personal computer 12 to the video server 11. In the data transfer from the video server 11 to the personal computer 12 as shown in FIG. 4, the procedure of transferring a part of a file in the video server 11 and saving the part as one file on the personal computer 12 is employed. On the contrary, in the data transfer from the personal computer 12 to the video server 11, one whole file on the personal computer 12 is transferred and inserted to a part of a file in the video server 11.

First, at step S11, the user designates a file name to be transferred in the personal computer 12 and a file name for insertion, a time code indicating an insertion position and a channel for insertion in the video server 11 to the extended FTP client 21, and instructs data transfer from the personal computer 12 to the video server 11.

Then, at step S12, the extended FTP client 21 opens a data transfer port and transmits the open port number together with the IP address to the extended FTP server 18. The extended FTP client 21 thus notifies that this port is to be used for the subsequent data transfer.

When the port is opened, the extended FTP client 21 notifies the extended FTP server 18 of start of data transfer at step S13. In this operation, the extended FTP client 21 also notifies the extended FTP server of the file name for insertion, the time code indicating the insertion position and the channel for insertion which are designated by the user.

On receiving the notification, at step S14, the extended FTP server 18 opens the designated file and shifts a file pointer to the position of the designated time code.

At step S15, the extended FTP client 21 opens the designated file in the personal computer 12 and starts transferring the file.

On receiving the file, at step S16, the extended FTP server 18 overwrites the channel designated at step S13 of the file opened at step S14 by the incoming data.

At step S17, the extended FTP client 21 sequentially checks whether the entire file has been completely transmitted or not. If the file has not been completely transmitted, the operation returns to step S15 to repeat data transfer.

On completion of transfer of the entire file, at step S18, the extended FTP client 21 closes the port opened at step S12 and closes the file which has been transferred. When the data transfer port is closed, the extended FTP server 18 interprets the closure as completion of data transfer and closes the overwritten file.

Figure 6:
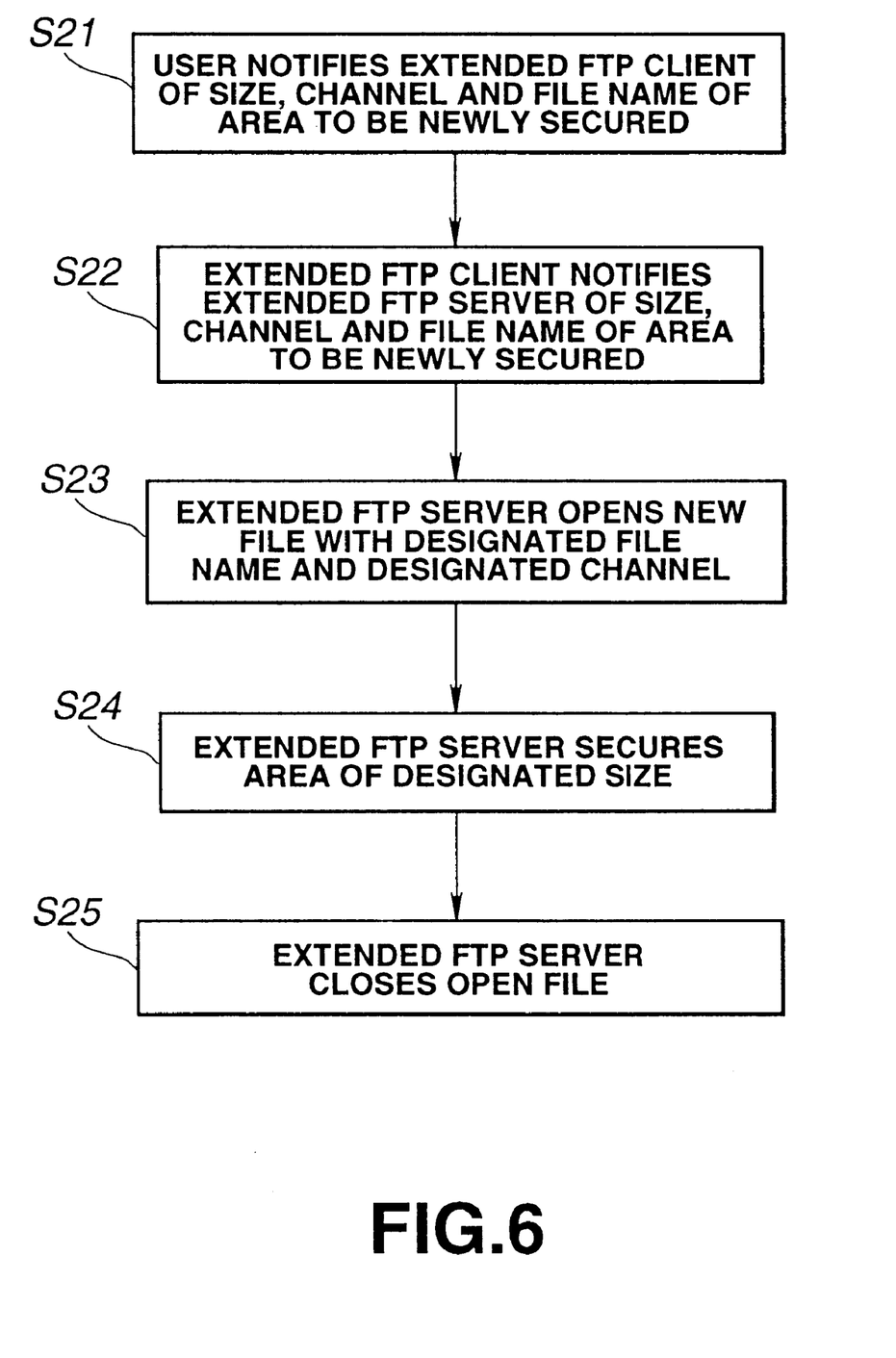
FIG. 6 is a flowchart illustrating an operation to secure a new area of the video server in the information transfer system.

With the above-described procedure alone, however, the file in the personal computer 12 cannot be transferred as a new file to the video server 11. Thus, the video server 11 is provided with a procedure for producing a new file having an area of a length designated by a time code. FIG. 6 is a flowchart showing the procedure for producing a new file in the video server 11 by the instruction of the personal computer 12.

At step S21, the user first notifies the extended FTP client 21 of securing a new area on the video server 11, and designates a file name to be newly produced, a time code indicating the size of the area to be secured and a video/audio channel to be secured.

Then, at step S22, the extended FTP client 21 notifies the extended FTP server 18 of securing the new area, and sends the file name, the time code indicating the size of the area to be secured and the video/audio channel to be secured which are designated by the user.

On receiving the notification, at step S23, the extended FTP server 18 opens the new file. In this operation, the extended FTP server 18 uses the information received from the extended FTP client 21 with respect to the file name and channel.

At step S24, the extended FTP server 18 secures the area for the designated time code in the open file.

Finally, at step S25, the extended FTP server 18 closes the file which has been opened.

With the above-described processing, a free file having a new area can be produced. By subsequently carrying out data transfer from the personal computer 12 to the video server 11 in accordance with the procedure as shown in FIG. 5, it is possible to transfer the file on the personal computer 12 as a new file to the video server 11.

Also, in the case where there are plural short files on the personal computer 12, by securing a large area in advance in accordance with the procedure of FIG. 6 and then repeating the procedure of FIG. 5 for several times, it is possible to transfer the plural discontinuous files on the personal computer 12 as one continuous file to the video server 11.

In the information transfer system 10 of this embodiment, the information transfer method of the present invention is applied for transferring video/audio data between the video server 11 and the personal computer 12. However, the information transfer method of the present invention may also be applied for transferring video/audio data between two video servers or transferring video/audio data between two general-purpose computers.

Also, among the data in the file, only the video data or each channel of audio data may be requested and transferred.

In addition, as physical media for information transfer, general-purpose computer network media, such as, FDDI (Fiber Distribution Data Interface) or Ethernet like 10BaseT, 10Base5 and 10Base2, may be used.

In the above-described information transfer method and apparatus, since only data of a part of information on the file basis are transferred between a video server having the information stored therein on the file basis and a general-purpose computer, only a necessary part of data can be transferred in data transfer from the video server. Therefore, the data transfer can be completed within the shortest time required. Also, since only the necessary data are transferred in recording the incoming data into the general-purpose computer, data of unnecessary parts need not be recorded in the recording unit. Therefore, a storage device having a large capacity is not required. Further, by transferring discontinuous data in the general-purpose computer to the video server, the data can be converted to one continuous data.

What is claimed is:

1. An information transfer method for transferring video information in the form of a file in a file format of a general purpose computer between a video server and said general-purpose computer, the method comprising the steps of:

transmitting in said file format a part of the file from the video server to the general-purpose computer; and forming a reconstructed file made up of the part of the file transmitted in said file format to the general-purpose computer.

2. The information transfer method as claimed in claim 1, further comprising the step of designating the position and size of the part of the file transmitted in said transmitting step.

3. The information transfer method as claimed in claim 1, further comprising the step of transmitting a data transfer start command, a file name including desired data, desired video/audio channel information, a time code indicating a start point of the desired data, and a time code indicating the length of the desired data from the general-purpose computer to the video server.

4. The information transfer method as claimed in claim 1, wherein the file is continuous information including audio data and video data.

5. The information transfer method as claimed in claim 1, wherein said file is transmitted in said transmitting step on a general-purpose computer network medium.

6. The information transfer method as claimed in claim 1, wherein said step of transmitting transmits said part of said file in accordance with a TCP/IP network protocol.

7. The information transfer method as claimed in claim 1, wherein said step of transmitting transmits said part of said file in accordance with a file transfer protocol FTP.

8. The information transfer method as claimed in claim 1, further comprising the steps of returning the file formed by the general-purpose computer to the video server, and updating the data of the part on the original file on the video server.

9. The information transfer method as claimed in claim 1, further comprising the step of transmitting a command for starting return of data, a file name for inserting return data, video/audio channel information for inserting the return data, and a time code indicating a start point for insertion from the general-purpose computer to the video server.

10. The information transfer method as claimed in claim 1, further comprising the steps of returning the file formed by the general-purpose computer to the video server, and forming a new file.

11. The information transfer method as claimed in claim 1, further comprising the step of transmitting a command for securing a new area, a new file name, video/audio information to be secured, and a time code indicating the size of the area from the general-purpose computer to the video server.

12. An information transfer apparatus for transferring video information in the form of a file in a file format of a general-purpose computer between a video server and said general-purpose computer, the apparatus comprising:

transmission means for transmitting in said file format a part of the file from the video server to the general-purpose computer and     formation means for forming a reconstructed file made up of the part of the file transmitted in said file format to the general-purpose computer.

13. The apparatus according to claim 12, wherein said general-purpose computer designates a position and size of the part of the file transmitted by said transmitting means.

14. The apparatus according to claim 12, wherein said transmitting means transmits the part of the file in accordance with a TCP/IP network protocol.

15. The apparatus according to claim 12, wherein said transmitting means transmits said part of said file in accordance with a file transfer protocol FTP.

16. The apparatus according to claim 15, wherein said transmitting means is an extended FTP server which transfers portions of the file in accordance with an extended FTP protocol.

* * * * *